US007081971B2

(12) United States Patent
Shaw et al.

(10) Patent No.: US 7,081,971 B2
(45) Date of Patent: Jul. 25, 2006

(54) SYSTEM AND METHOD FOR PRINTING ON MAILPIECES USING A FIXED PRINT HEAD

(75) Inventors: Lyle W. Shaw, Southbury, CT (US); John H. Steinmetz, Bridgeport, CT (US)

(73) Assignee: Pitney Bowes Inc., Stamford, CT (US)

( * ) Notice: Subject to any disclaimer, the term of this patent is extended or adjusted under 35 U.S.C. 154(b) by 846 days.

(21) Appl. No.: 09/863,997

(22) Filed: May 23, 2001

(65) Prior Publication Data

US 2002/0176111 A1 Nov. 28, 2002

(51) Int. Cl.
*G06F 15/00* (2006.01)
*H04N 1/387* (2006.01)
*H04N 1/04* (2006.01)
*B41J 2/015* (2006.01)

(52) U.S. Cl. .................. 358/1.18; 358/1.12; 358/1.13; 358/452; 358/462; 358/488; 358/498; 400/104; 347/20

(58) Field of Classification Search ................ 358/1.5, 358/1.18, 1.12, 1.13, 452, 462, 488, 498; 53/460; 229/68.1; 705/401, 402; 347/107, 347/5, 14, 20; 283/74
See application file for complete search history.

(56) References Cited

U.S. PATENT DOCUMENTS

| | | | | |
|---|---|---|---|---|
| 4,024,380 A | | 5/1977 | Gunn | 235/61.9 A |
| 4,247,008 A | | 1/1981 | Dobbs | 209/569 |
| 4,578,759 A | | 3/1986 | Horii | 364/478 |
| 4,691,100 A | | 9/1987 | Kizu et al. | 250/223 |
| 4,736,441 A | | 4/1988 | Hirose et al. | 382/48 |
| 4,998,626 A | | 3/1991 | Ota | 209/584 |
| 5,031,223 A | | 7/1991 | Rosenbaum et al. | 382/1 |
| 5,538,138 A | | 7/1996 | Reich | 209/3.3 |
| 5,730,533 A | * | 3/1998 | Noy et al. | 400/104 |
| 5,881,890 A | | 3/1999 | Wiley | 209/703 |
| 5,901,855 A | | 5/1999 | Uno et al. | 209/584 |
| 5,912,682 A | | 6/1999 | Parkos | 347/40 |
| 5,932,139 A | * | 8/1999 | Oshima et al. | 252/301.16 |
| 5,933,676 A | * | 8/1999 | Ohno | 399/8 |
| 6,045,277 A | * | 4/2000 | Kurashina et al. | 400/615.2 |
| 6,597,474 B1 | * | 7/2003 | Yoshida | 358/439 |
| 6,624,902 B1 | * | 9/2003 | Yoshikawa | 358/1.12 |
| 6,965,451 B1 | * | 11/2005 | Ogg et al. | 358/1.8 |

* cited by examiner

*Primary Examiner*—Douglas Q. Tran
*Assistant Examiner*—Chan S. Park
(74) *Attorney, Agent, or Firm*—Michael J. Cummings; Angelo N. Chaclas

(57) ABSTRACT

A system for printing markings along the top and bottom of mailpieces, using a print head in a fixed position. The print head receives print instructions either from a print module or an inverted print module and prints one or more first markings onto the mailpiece, the mailpiece being in a first orientation. The mailpiece is rotated so that it is in a second orientation, which is approximately 180 degrees from the first orientation. The print head prints on the mailpiece one or more second markings that are oriented 180 degrees with respect to the orientation of the one or more first markings printed onto the mailpiece. The one or more second markings shares the same upright orientation as the one or more first markings when printed onto the mailpiece and when subsequently read.

7 Claims, 5 Drawing Sheets

SYSTEM AND METHOD FOR PRINTING ON MAILPIECES USING A FIXED PRINT HEAD

BACKGROUND OF THE INVENTION

The invention relates to printing along the top and bottom of mailpieces. More particularly, the invention relates to a system and a method for printing along the top of mailpieces and along the bottom of mailpieces using a fixed print head.

Processing mailpieces takes place not only at United States Postal Offices, but also at virtually all businesses or operations where communications via a mail delivery system is utilized. Various pieces of mail generated by numerous departments and individuals within a company must be addressed, collected, and sorted as part of the outgoing mail process. Each mailpiece must be individually addressed, metered, and delivered. Additionally, it is often desirable to add other markings to outgoing mailpieces such as advertisements, slogans, and POSTNET bar codes to outgoing mailpieces.

Because meter information is printed along the tops of a mailpieces and POSTNET barcodes are printed along the bottoms of the mailpieces, prior art systems have typically utilized two separate machines for printing the meter information and the POSTNET barcodes. The first machine, such as the "Galaxy"™ by Pitney Bowes Inc., has a printer with a print head positioned for printing meter indicia, postal inscriptions, and advertisement slogans along the tops of the mailpieces. The second machine, such as Pitney Bowes Inc., "M3"™ Mixed Mail Manager mail sorter has a printer with a print head positioned for printing POSTNET barcodes along the bottoms of the mailpieces. Typically, having a two-machine arrangement requires twice the mechanical hardware, computer hardware, and software, which increases the overall cost of the mail system. Additionally, with the increase in hardware and software components there is an increase in mail processing time and labor and in machine failures and breakdowns. Component breakdown translates into an increase in down time and an increase in repair costs or component replacement costs. Moreover, the two-machine arrangement increases the amount of floor space required to accommodate a mail system.

A need thus exists for a system and method that provides for printing along the top of mailpieces and along the bottom of mailpieces using a single print head.

SUMMARY OF THE INVENTION

Deficiencies in the prior art are overcome, and an advance in the art is achieved with a system for printing along tops and bottoms of mailpieces using a print head in a fixed position. The print head prints two or more sets of markings onto the mailpiece, one set in a first orientation and the other set in a second, inverted orientation. These markings can be characters, numbers, symbols, graphics, meter indicia, barcodes, POSTNET barcodes, advertisements, and/or advertisement slogans. A memory containing data representative of the first set of one or more markings by a print module, which converts the data to print instructions that are executed by the print head. An inverted print module, also coupled to the memory and to the print head, reads the data representative of the second set of one or more markings from the memory, and converts the data to print instructions that instruct the print head to print the second set of one or more markings, which is inverted on the print head from that of the first set of one or more markings, onto the mailpiece which is now inverted. A control module is coupled to the print module and inverted print module. The control module sends marking requests to either the print module or the inverted print module when printing either upright or inverted markings, respectively, and either the print module or the inverted print module sends print instructions to the print head. The marking requests indicating which data representative of one or more markings are to be read from the memory, by the print module or the inverted print module.

Operationally, the system prints along top and bottom of mailpieces using a fixed print head by printing a first set of one or more markings on a mailpiece, the mailpiece being in a first orientation. The mailpiece is rotated so that it is in a second orientation, which is approximately 180 degrees from the first orientation, and the fixed print head prints on the mailpiece a second set of one or more markings that are oriented 180 degrees with respect to the orientation of the first markings printed on the mailpiece.

DETAILED DESCRIPTION

Figure 1:
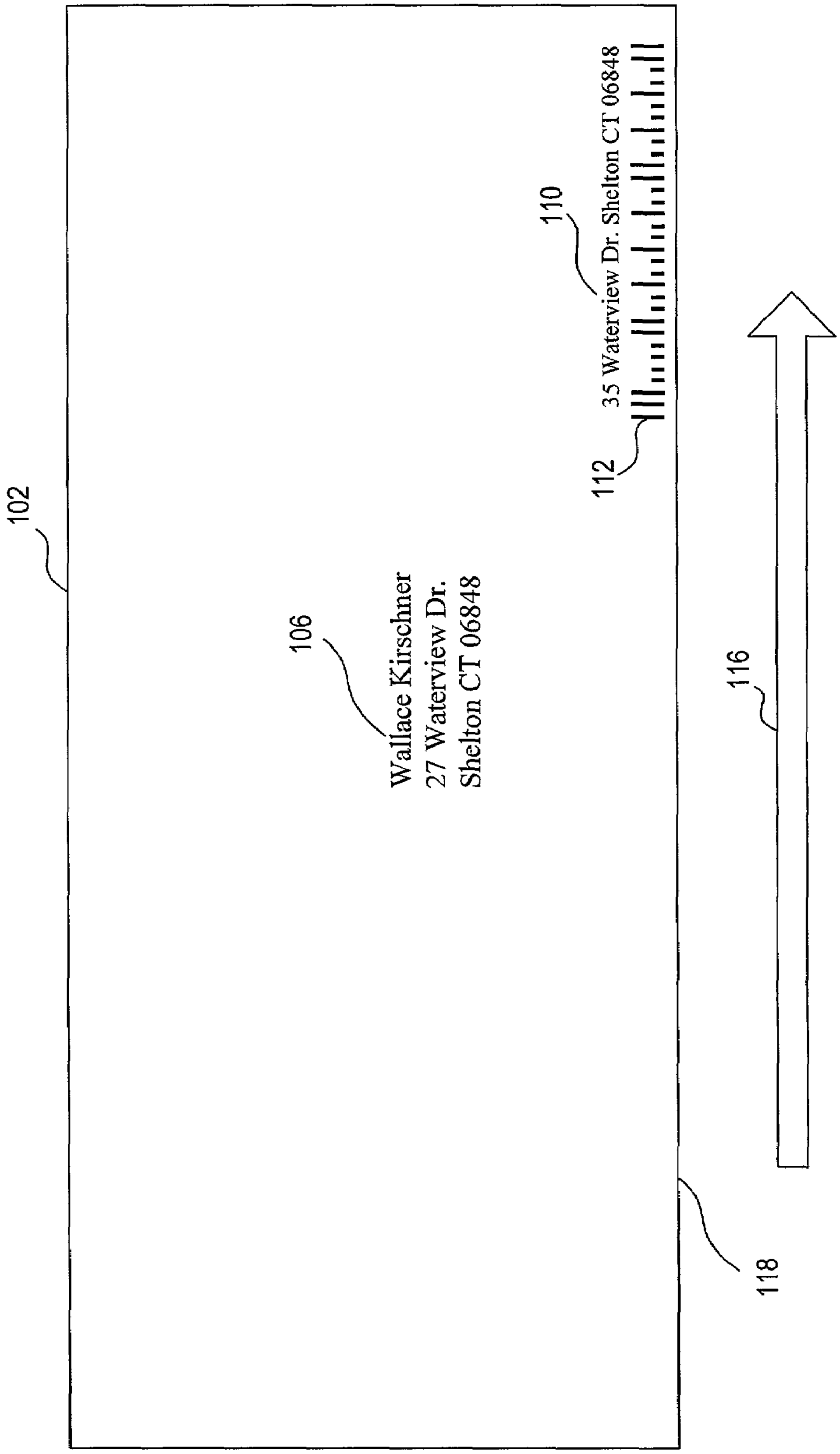
FIG. 1 illustrates a mailpiece in an upright orientation.

FIG. 1 illustrates an example of an upright mailpiece 102. The mailpiece includes an address 106, a United States Postal Service FASTforward correction address 110, and a United States Postal Service POSTNET barcode 112, all of which are upright. Arrow 116 indicates the direction that the mailpieces travels with respect to a print head, and a bottom edge 118 is also represented in FIG. 1.

Figure 2:
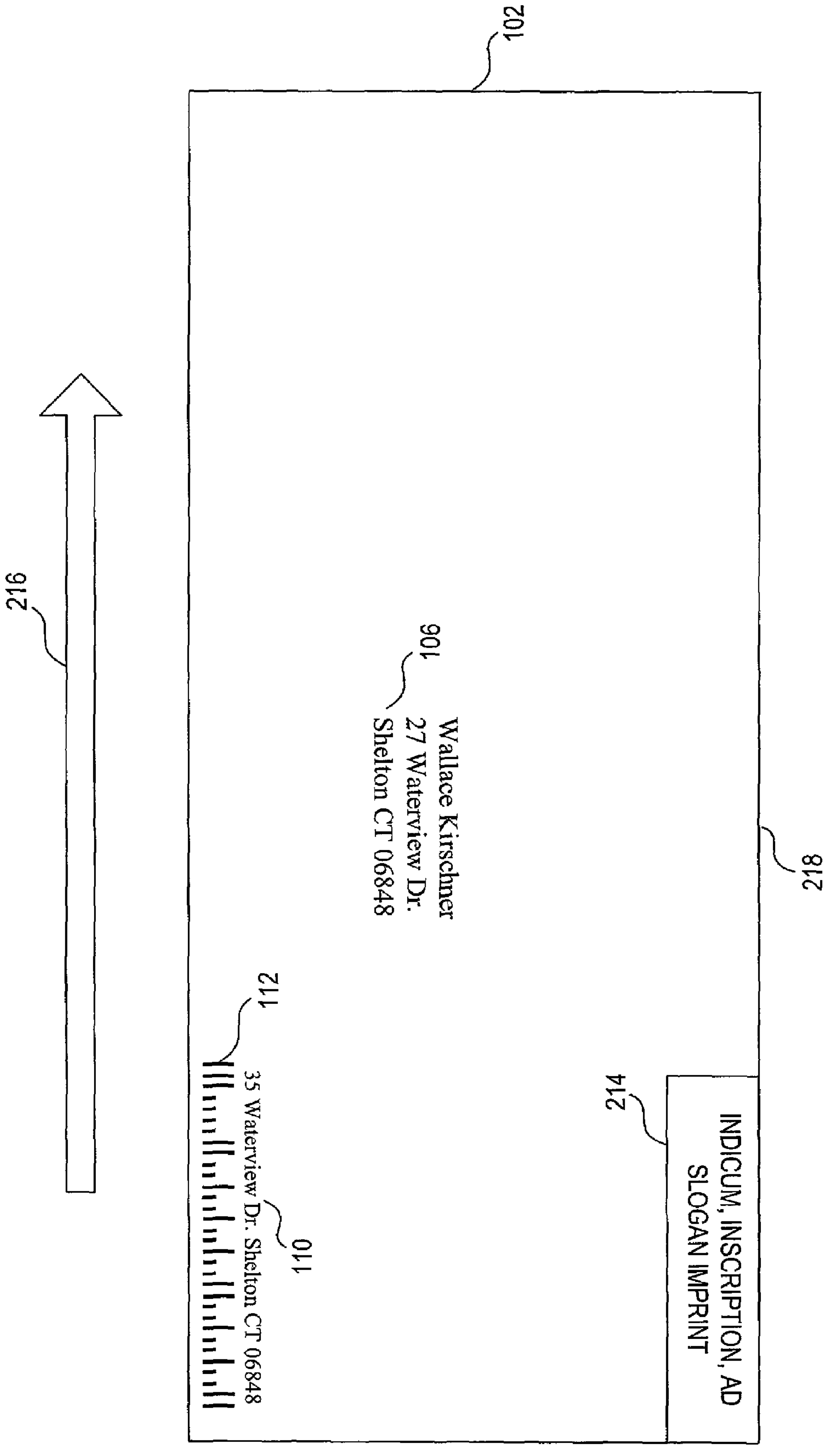
FIG. 2 illustrates a mailpiece in an inverted orientation.

FIG. 2 illustrates an example of mailpiece 102 in an inverted orientation. The mailpiece still includes address 106, United States Postal Service FASTforward correction address 110, and United States Postal Service POSTNET barcode 112; and now also includes inverted markings 214. Arrow 216 indicates the direction that the mailpieces travels with respect to a print head, and a bottom edge 218 is also represented in FIG. 2.

When a mailpiece is traveling upright and from left to right past a print head, the right most column of a marking is printed first. An "upright" mailpiece means that when information (for example address information or the information being printed) is viewed on the mailpiece it appears upright. Accordingly, a word is printed from left to right and a sentence is printed from left to right. To illustrate, "35 Waterview" is printed in the following sequence: "w" "e" "i" "v" "r" "e" "t" "a" "W" "5" "3". Because the mailpiece is moving from left to right the past print head, the print appears on the mailpiece as "35 Waterview" (see correction address 110 of FIG. 1), which is referred to as upright print. The actual markings of each number and character in "35 Waterview" are also printed from right to left. So, the marking of the number "3" is printed from right to left.

A mailpiece that is inverted is rotated approximately 180 degrees from its upright orientation, the side of the mailpiece facing a print head remains the same for both the upright and the inverted mailpiece orientation. An inverted mailpiece is shown in FIG. 2. It is to be noted that inverted markings are printed on the mailpiece in an upright (i.e. the same) orientation as non-inverted markings. Thus, the term "inverted marking" means, instead, that the marking is inverted on the print head during printing, not that the marking is inverted on the mailpiece. Because the mailpiece is also inverted during printing of the inverted marking, the inverted marking shares the same upright orientation as a non-inverted marking when printed on the mailpiece and when subsequently read.

Because the print head is in a fixed position, to print along the top and bottom of a mailpiece, the mailpiece has to pass through mail sorter 300 at least twice, or at least pass the print head twice. One pass with the mailpiece upright and one pass with the mailpiece inverted. This process takes advantage of the fact that a mailpiece typically passes through a mail sorter more than once, as mentioned earlier. An inverted mailpiece is a mailpiece that is upside down in reference to existing markings on the mailpiece. For example, mailpiece 102 of FIG. 2 is upside down in reference to inverted address 106. Accordingly, when inverted mailpiece 102, of FIG. 2, is traveling from left to right past the print head, inverted markings 214 must be printed in an orientation that is rotated approximately 180 degrees from its normal print orientation. Otherwise, when inverted mailpiece 102 is viewed, inverted markings 214 will appear upside down and backwards in reference to address 106, of FIG. 2. To accommodate for this, inverted markings 214 must be printed 180 degrees rotated from its normal print orientation. The term "inverted", in reference to markings, refers to a marking while on the print head that is rotated 180 degrees from its normal orientation when read on the mailpiece. Thus, when inverted markings 214 are viewed together with address 106, both will appear upright, in reference to each other. The printing of inverted markings are described in more detail below.

Of course, if it intended to only print either along the top of the mailpiece, or along the bottom of the mailpiece, then the mailpiece only has to pass by the print head once, in either an upright position or an inverted position. It should be realized that the movement of the mailpiece from left to right, in reference to the print head, is only for illustrative purposes. The mailpiece can travel from right to left, so long as the printing sequence and orientation is modified to accommodate the right to left motion.

Figure 3:
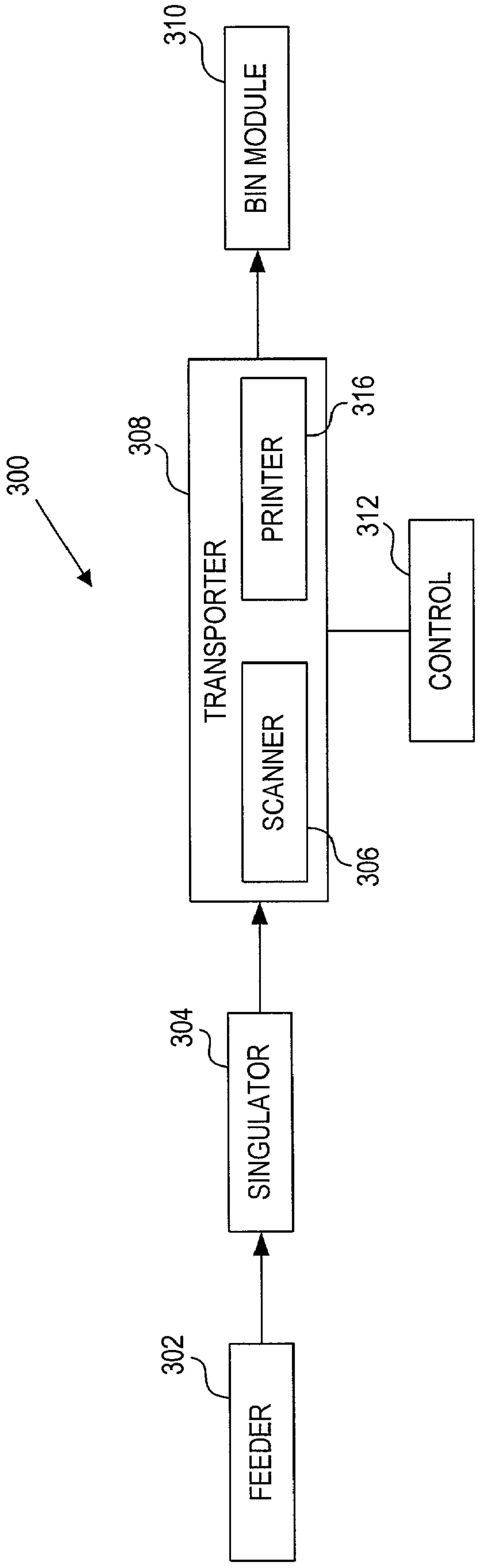
FIG. 3 is a block diagram of the hardware components of the subject invention.

FIG. 3 shows components of a mail sorter 300, which includes a mail feeder 302, a singulator 304, a scanner 306, a transporter 308, a bin module 310, a printer 316, and a control module 312. Generally, the operation of mail sorter 300 entails an operator placing an armload of mailpieces that has been aligned onto mail feeder 302. The mailpieces are fed into mail sorter 300 via mail feeder 302 and singulator 304, and transported past scanner 306 and printer 316 by transporter 308, and finally sorted in bins at bin module 310. Mail sorter 300 is controlled by control module 312, which interacts with the above-mentioned components to coordinate the transfer of the mailpieces through mail sorter 300.

Typically, mailpieces are sorted multiple times because there are fewer bins in a mail sorter than delivery points (for example USPS postal ZIP codes). So, in a sort (rough sort) each bin may represent all the mailpieces addressed to a particular neighborhood. In another sort (fine sort), each bin may represent all of the mailpieces addressed to each street from one neighborhood. In yet another sort, each bin may represent all of the mailpieces addressed to each street from another neighborhood. Delivery points will almost invariably outnumber the number of bins in the sorting apparatus, which forces at least two passes.

As mentioned above, mail feeder 302 performs the function of feeding mailpieces into mail sorter 300. Mailpieces include mailpieces of various heights and lengths, so there may be, for example, a tall mailpiece followed by a short mailpiece fed into mail sorter 300. It should be realized that mailpieces also include mailpieces and having the same height and/or length. For example, every mailpiece fed into mail sorter 300 has a height of 5 inches. In another example, every mailpiece fed into mail sorter 300 has a height of 9 inches. An operator of mail sorter 300 loads the mailpieces in a vertical position and in either an upright or an inverted (upside down) position. When a mailpiece is in a vertical position it is standing on an edge. Included in feeder 302 are sensors for monitoring mailpieces that have begun the sorting process. Sensors within singulator 304 operate in connection with control module 312 to monitor and facilitate a smooth transfer of mailpieces through singulator 304. The transfer of mailpieces from feeder 302 to singulator 304 is facilitated by control module 312 in response to sensor information.

Singulator 304 includes feed belt assemblies into which mailpieces from a stack of mailpieces are fed by feeder 302. Sensors within singulator 304 operate in connection with control module 312 to monitor and facilitate a smooth transfer of mailpieces through singulator 304. As with feeder 302 and singulator 304, the transfer of mailpieces from singulator 304 to transporter 308 is facilitated by control module 312 in response to sensor information. Further details of singulator 304 are fully described in an application entitled A Singulating Apparatus For A Mail Handling Machine, which was filed on Oct. 3, 1997 under U.S. application Ser. No. 08/943,407 which is incorporated by reference.

Transporter 308 includes a scanner 306, which operates in connection with control module 312, for capturing markings on the mailpieces. The captured markings may be, for example, handwritten or printed address information, barcodes of various formats and dimensions, or return to sender graphics, such as a pointing finger. Transporter 308 includes rollers and belt transport assemblies to effectively transport individual mailpieces in a vertical position, from left to right, passed scanner 306, printer 316, and on to bin module 310, where the mailpieces are sorted.

Control module 312 is a general-purpose computer having a processor, memory, internal communications busses, a user interface such a mouse, keyboard and monitor, and a communications module for interacting with external components and modules, such as those mentioned above. Included in control module 312 are a number of components and modules providing software and hardware functionality that control, communicate, and process information shared among the components and modules within mail sorter 300.

Scanner 306 is a high-resolution video camera that scans the surface of the mailpiece and captures image data of one or more captured markings on the mailpiece. To expand on the above list, captured markings can be anything, such as a barcode, a two dimensional barcode, a meter indicia, a picture, an advertisement, one or more characters, and address information. In this illustration, scanner 306 automatically captures image data of the address information (captured markings) on the mailpiece and sends image data to control module 312 for analysis.

Figure 4:
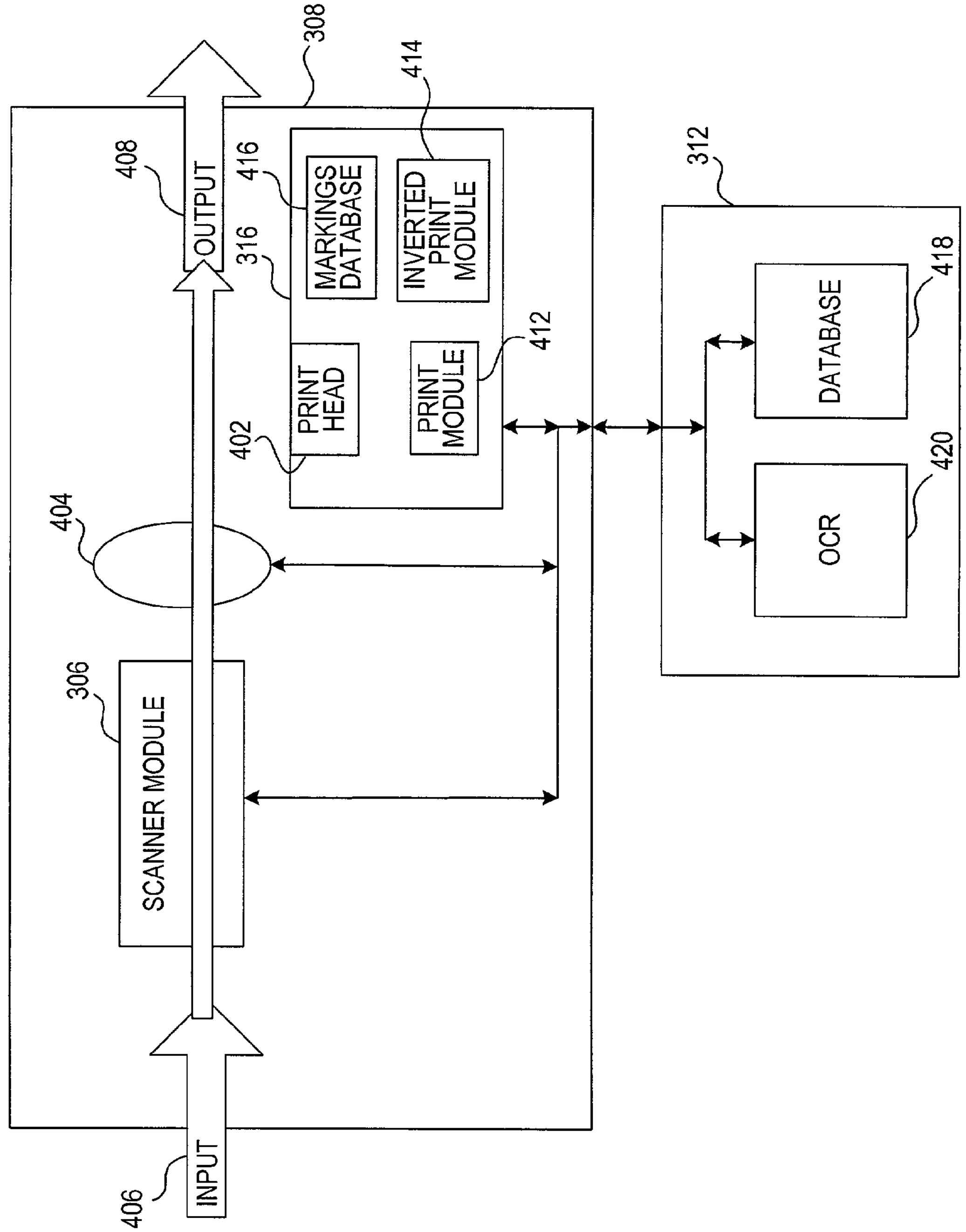
FIG. 4 is a detailed schematic diagram of control module and transporter of FIG. 3.

Referring to FIG. 4, sensor 404 within transporter 308 operates in connection with control module 312 to monitor the movement of mailpieces through transporter 308 and past print head 402. It should be realized that a single sensor, such as sensor 404, is used in this illustration and that multiple sensors and sensor arrangements can be used. While the mailpieces are traveling through transporter 308, sensor 404 detects the mailpieces and sends signals to control module 312 indicating the detection of such mailpieces. When control module 312 receives the signals, it responds by sending marking requests to either print module 412 or inverted print module 414. If print module 412 receives marking requests, it reads marking bit-map data, from a markings database 416, that represents an upright marking and translates the marking data into print information. If inverted print module 414 receives marking requests, it reads marking bit-map data, from markings database 416, and inverts the bit-map data so that the marking is inverted (a marking rotated 180 degrees with respect to the upright marking of print module 412) and translates the marking data into print information. Print module 412 and inverted print module 414 receive marking requests from control module 312. Print module 412 and inverted print module 414 are described in more detail below.

Control module 312 also receives mailpiece speed data from transporter 308, which is used to determine the length of the next mailpiece to pass print head 402. The length of the mailpiece is needed to determine when printer 316 should start printing when printing in a location other than at the lead edge of the mailpiece, such as when printing inverted markings 214, of FIG. 2. Knowing the speed that a mailpiece is passing by sensor 404 and the time it takes for the mailpiece to pass sensor 404, control module 312 determines the length of the mailpiece. Knowing the length of the mailpiece, control module 312 determines when to initiate inverted print module 414 when printing inverted markings 214. The time it takes a mailpiece to pass sensor 404 is determined by control module 312 receiving a first signal from sensor 404 and a second signal from sensor 404 and noting the time between the two signals. The first signal is generated when sensor 404 detects a first edge of the mailpiece and the second signal is generated when sensor 404 detects the second edge of the mailpiece. An example of a simple equation is: $L=S/T$, where $L$=length of mailpiece, $S$=speed of mailpiece, and $T$=time for mailpiece to travel a distance equal to its length.

Referring to FIG. 4, mailpieces enter transporter 308 at input 406 and passes in front of print head 402 before exiting transporter 308 at output 408. It should be realized that printer 316 can be implemented in various types of mail sorters and at different locations within the mail sorters. Thus, input 406 and output 408 can be coupled to other components within a mail sorter and can be located at one of a number of locations within the mail sorter.

A print head 402 is included in printer 316, which, in this illustration, utilizes conventional ink-jet technology. It should be realized that the use of inkjet technology is for illustrative purposes and other print technologies, such as hot wax or continuous ink jet printing can be used. In this illustration, print head 402 has a thin line of nozzles, for example 300 nozzles, positioned vertically. The nozzles discharge ink on to the mailpiece in response to control signals from either print module 412 or inverted print module 414. The control signals activate the discharge of ink from the nozzles in a pattern reflective of the marking that is being printed on the mailpiece. The marking printed can be anything, for example, a barcode, a two dimensional barcode, a meter indicia, a picture, an advertisement, and address information. The orientation of the marking printed can also be varied. For example, an inverted marking can be printed (rotated 180 degrees), upright, or on an angle, in reference to other markings on the mailpiece, or in reference to a specific orientation of the mailpiece.

Print head 402 is positioned so that it can print markings, such as correction address 110, POSTNET barcode 112, and inverted markings 214. When mailpiece 102 passes print head 402, print head 402 prints markings along bottom 118 of mailpiece 102. It should be realized that bottom 218 does not necessarily refer to the bottom of the mailpiece, in reference to the orientation of address 106. The bottom is in reference to the mailpiece itself, when the mailpiece is in the vertical position and traveling through sorter 300. In other words, the bottom is not in reference to the orientation of markings printed on the mailpiece, such as address 106. Accordingly, the bottom of the mailpiece can be either the top of mailpiece 102 traveling inverted (upside down) through mail sorter 300, or the bottom of mailpiece 102 travelling upright through mail sorter 300.

FIG. 4 includes a detailed illustration of control module 312, which shows an optical character recognition (OCR) 420, inverted print module 414, print module 412, a database 418, which are described in more detail below. The optical character recognition (OCR) 420 analyzes the captured image data of the captured markings captured by scanner 306. OCR 420 translates the captured image data to American Standard Code for Information Interchange (ASCII) characters, which is a standard format and is recognized by control module 312. Control module 312 uses the ASCII characters, which in this illustration represents address information on a mailpiece, to perform queries of database 418 for information related to the address information. In this illustration, the related address information is a POSTNET barcode 112, or address correction information 410 or both. It should be realized that scanner 306 is capable of capturing any marking on the mailpiece, such as POSTNET barcode 112, other barcodes, and meter indicia, and the markings or markings data can be used by control module 312 to query database 418 for related information. For example, control module 312 receives captured image data, from scanner 306, and automatically reads the data. Control module 312 uses the data to determine what should be printed on the mailpieces. For example, control module 312 uses captured image data of address 406, captured by scanner 306, to query database 418 for information associated with address 406, such as POSTNET barcode 112, which represents the ZIP code of address 406. Next, a POSTNET barcode 112 is printed on the mailpiece, based on the ZIP code. Alternatively, control module 312 can use captured image data of inverted address 506 to query database 418 for meter rate information and print the meter rate as inverted print markings 514. Control module 312 sends marking requests to print module 412 and inverted print module 414.

Database 418 and markings database 416 are conventional relational databases—for example, Microsoft Access—that provide the functionality of storing and reading data in table format, querying the data, creating forms, creating reports and macros, to name only a few functions. Generally, database 418 stores information such as a national address directory, and the POSTNET information, which are described in more detail below. In one illustrative embodiment, database 418 includes tables that have a national address directory and related POSTNET information. Markings database 416 stores marking data as bit-maps. The Microsoft Access software package allows for the creation, population, and access of the information within database 418 and 416. Database 418 resides in memory within control module 312 and is coupled to the other components and modules, such as OCR 420. Markings database 416 resides in memory within printer 316 and is coupled to the other components and modules, such as print module 412 and inverted print module 414.

Control module 312 interacts with printer 316, and uses data detected by sensor 404 to determine when to instruct printer 316 to print information. When control module 312 determines that printer 316 should start printing, bit-map data is sent to print head 402. Examples of markings stored in markings database 416 that can be printed are: characters, numbers, symbols, pictures, advertisements, postage meter indicia, an eagle drawing, a serial number, etc. In this illustration, markings are stored in markings database 416 as bit-map patterns. A bit-map is a representation, consisting of rows and columns of dots, which defines a marking, stored in memory. The marking can be, for example, a single letter. The value of each dot (i.e. whether it is filled or not) is stored in one or more bits of data. In bit-mapped representations, a dot is a single, smallest identifiable part of a marking. For simple monochrome markings, one bit is sufficient to represent each dot. Markings database 416 stores bit-map patterns for every individual marking that printer 316 may be requested, by control module 312, to print on a mailpiece. The bit-maps are later translated into print information, by either print module 412 or inverted print module 414 and sent to print head 402.

Print module 412 generates marking data representing upright markings, which is transformed into print instructions and communicated to print head 402. In this illustration, upright markings are printed upright on the mailpiece, for example address 406. Print module 412 reads a bit-map, that is going to be printed upright, in an order from right to left, and transforms the bit-map to print information. Accordingly, print head 402 prints the marking in an upright orientation, and starts by printing the right side of the marking and moves on to the left of the marking.

To print on a mailpiece travelling from left to right past print head 402, control module 312 sends marking requests to print module 412 to read a bitmap of a marking that is to be printed. Print module 412 reads the bit-map, located in markings database 416, in an order from right to left and translates the bit-map information into print information. More specifically, print module 412 reads the dots in the right most column in the bit-map, transforms the dots to print instructions and sends the print instructions to print head 402 to print the dots on the mailpiece. Next, print module 412 reads the column to the left of the right most column in the bit-map and sends print instructions to print head 402 to print the dots in this column. This process continues until the bit-map for this particular marking is printed. Then, print module 412 reads the right most column of the bit-map that represents the next marking to be printed.

In situations where the mail piece is inverted, (e.g. inverted mailpiece 402), inverted print module 414 reads bit-map data and transforms the bit-map data to markings that are inverted, as described above. The bit-map data is transformed and communicated to print head 402. In this illustration, inverted print module 414 prints inverted markings (for example inverted markings 214) on the mailpiece. Inverted print module 414 transforms conventional bit-map markings stored in memory to inverted markings.

More specifically, when the mailpiece is inverted (oriented upside down), control module 312 sends marking requests indicating to inverted print module 414 what bit-maps to read. Inverted print module 414 reads the dots in the left most column of the bit-map and changes the print location of each dot before sending print instructions to print head 402. Inverted print module 414 generates print instructions for print head 402 that represent inverted markings (i.e. rotated 180 degrees clockwise). The print location of a dot is determined by reading the dot and assigning it a different print location. Because the mailpiece is inverted, in this example, the dot at the top of the column is assigned the print location of the bottom dot. The bottom dot is assigned the print location of the top dot. The dot that is second from the top of the column is assigned a print location that is second from the bottom. This process continues for each dot within a column. Once the dots in the left most column have been reassigned, inverted print module 414 reads and reassigns the dots in the column to the right of the left most column and continues until the marking is printed. Accordingly, the marking is printed in an orientation that is rotated 180 degrees from the upright orientation, so that when the mailpiece is viewed in an upright orientation, the marking is also oriented upright and in a position to be read from left to right, if the marking included characters. After the dots in the column are reassigned, inverted print module 414 sends instructions to print head 402 to print the dots in this column. This process continues until the bit-map for this particular marking is printed. Then, inverted print module 414 reads the right most column of the bitmap that represents the next marking to be printed, if any.

Accordingly, during the following sorting pass, the markings are printed, by print head 402, rotated 180 degrees (inverted). Thus, after two or more passes of the mailpiece past printer 316, a mailpiece, for example, can have a POSTNET barcode 112 printed at the bottom of the mailpiece (during a pass) and inverted markings 214, such as meter indicia, printed in the upper right side of the mailpiece (during a following pass). It should be realized that by utilizing inverted markings and markings, the ability to print on the top and bottom of mailpieces, with a single print head 402, in a fixed position, is achieved. It should also be realized that by providing the functionality to print inverted markings, a single fixed print head is used to print along the tops of mailpieces.

Alternatively, instead of reassigning print locations to the bit-maps when printing inverted markings, the bit-maps can be stored in markings database 416 in an inverted orientation. This would allow print module 412 to read from markings database 416 bit-maps and inverted bit-maps, without having to reassign the print locations of the inverted bit-map dots.

As mentioned above, the mailpieces engage in two or more passes; an upright mailpiece pass and an inverted mailpiece pass. Accordingly, an operator is aware of the orientation of the mailpieces and sets control module 312, employing the user interface, for either upright or inverted print. If mail sorter 300 is processing upright mailpieces, then control module 312 sends marking requests to print module 412. In contrast, if mail sorter 300 is processing inverted mailpieces, then control module 312 sends marking requests to inverted print module 414.

During a pass with an upright mailpiece, the mailpiece enters transporter 308 at input 406 and enters or passes printer 316 and is oriented such that the mailpiece is vertical and facing print head 402. As the mailpiece travels past printer 316, print head 402 prints markings on the mailpiece upright and from right to left, as described above. During a pass with an inverted mailpiece in a vertical orientation and with the front of the mailpiece facing print head 402, inverted markings are printed on the inverted mailpiece and printed from left to right, such that these markings, too, are upright when the mailpiece is upright. In other words, the mailpiece was upside down when it passed by print head 402, with respect to its orientation during the previous pass, the inverted markings have the same orientation as the markings that were printed upright on the mailpiece during the previous pass. Thus, when the mailpiece is read, all of the markings are oriented upright and can be read from left to right.

The following discussion discloses an operational schema where mailpieces are routed through mail sorter 300 one or more times and one or more markings are printed along the top and bottom of the mailpieces, using a single fixed printer head.

Generally, in accordance with the principles of this invention, as mailpieces pass through mail sorter 300, their address information are captured and their POSTNET barcodes and/or address correction information are determined, and printed onto the bottoms of the mailpieces. In a next pass through mail sorter 300, the same mailpieces are oriented upside down (inverted), in reference to their orientation during the earlier pass, and markings, such as meter indicia, are printed along the top of the mailpieces. The POSTNET barcodes and/or address correction information are printed along the bottom of the mailpieces and meter indicia are printed along the top of the mailpieces, using a single fixed print head.

Figure 5:
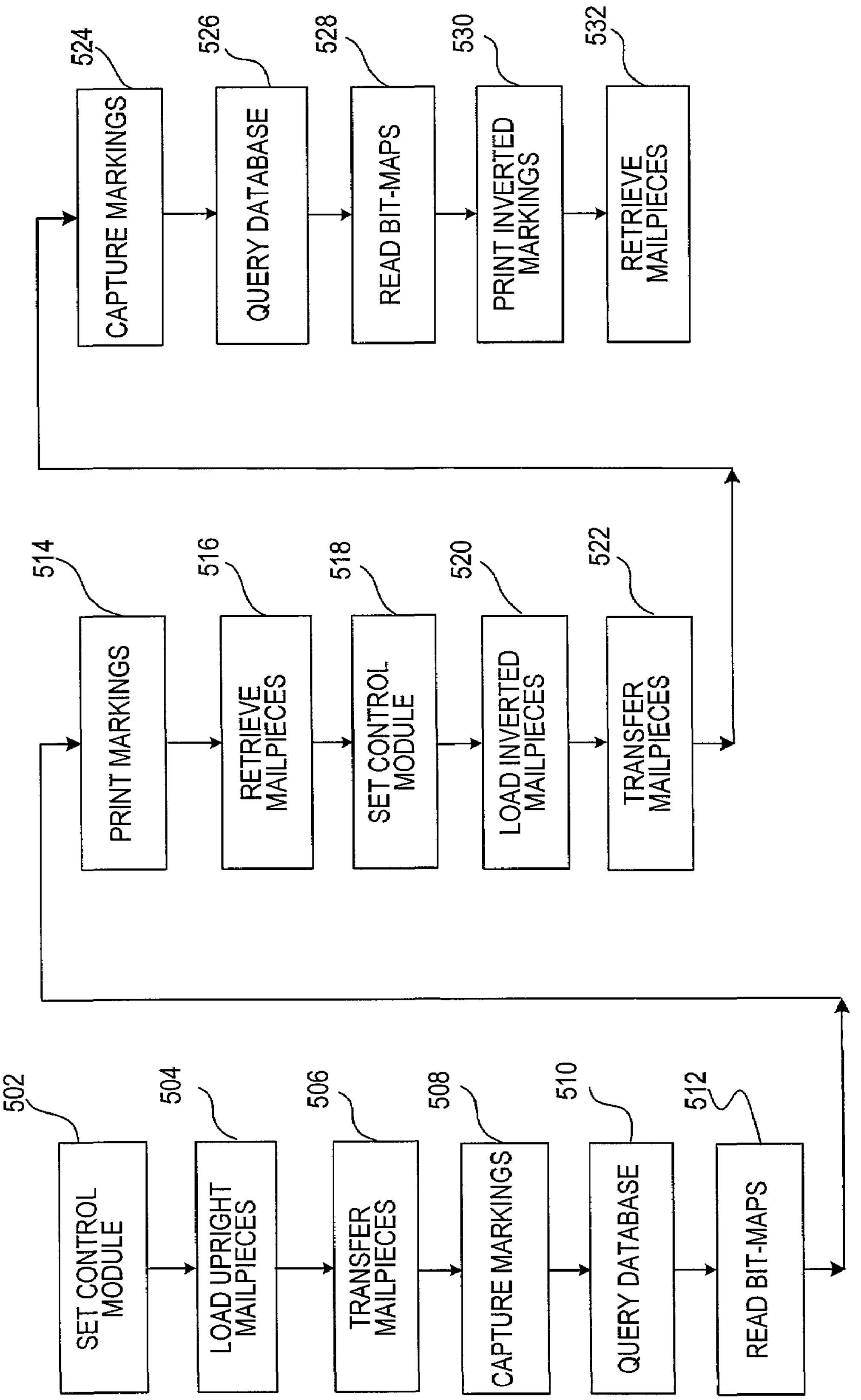
FIG. 5 shows a flowchart of a process carried out in the system presented in FIG. 3.

Referring to FIG. 5, at block 502 an operator of mail system 300 uses the user interface to set control module 312 to print markings on mailpieces in an upright orientation. Because the operator is aware of the orientation of the mailpieces when placed on feeder 302, he or she sets control module 312 to print markings in accordance with the orientation of the mailpieces. For this pass, the mailpieces are oriented in the upright position. As a result, control module 312 is set to print upright markings. By setting control module 312 to print upright markings, control module 312 will send marking requests to print module 412, rather than to inverted print module 414.

At block 504, the operator loads mailpieces in an upright and vertical position onto feeder 302, which feeds the mailpieces into singulator 304. It should be realized that the mailpieces and print head 402 are oriented vertically for the purpose of this illustration, but could be oriented horizontally to function with a mail sorter that moves mailpieces horizontally. As mentioned before, the mailpieces are loaded in an upright and vertical orientation, with the front of the mailpieces oriented such that they will face print head 402 as they are transported passed it. Because at block 502 the operator sets control module 312 to print upright markings, the operator loads the mailpieces in an upright position.

At block 506, the mailpieces are transferred from feeder 302 to singulator 304, which moves the mailpieces to transporter 308, while assuring that only one mailpiece at a time is forwarded to transporter 308. Transporter 308 transports each mailpiece in a vertical orientation, from left to right passed scanner 306.

In reference to a single mailpiece, at block 508, scanner 306 scans the surface of the mailpiece and captures image data of the address on the mailpiece and sends the image data to control module 312. OCR 420 translates the image data to ASCII characters, which represent the address on the mailpiece.

At block 510, using the ASCII representation of the address, control module 312 queries a national address directory table stored in database 418 for an address that matches, at least part, of the address information captured by scanner 306. For example, if an address street number, street name, and zip code, captured from the mailpiece are found in the query of the national address directory, the information can be used to determine a related POSTNET barcode information. Once the address is located in the table, control module 312 sends marking requests to either print module 412 or to inverted print module 414 to assemble the appropriate barcode from bit-maps representing numbers 0 through 9 and other patterns, such as start and stop patterns. These bit-maps are stored in markings database 416. The barcode represents the specific Zip code of the mailpiece. In this illustration it is print module 412 that reads the bitmaps for barcode, because the barcode is being printed upright.

Additionally, a correction address can be printed with or without the POSTNET barcode. For example, if an addressee name, residence number and street address, and zip code are found from a query of a forwarding address section of database 418, control module 312 can compare the name, residence number from the national address directory in database 418 with the residence number captured by scanner 306. If there is a forwarding address for the recipient, control module 312 sends marking requests to either print module 412 or to inverted print module 414 to read the associated forwarding address data bit-maps and transform it into print instructions. In this illustration it is print module 412 that reads the bit-maps for upright markings, because the correction address is being printed upright. The forwarding address is usually printed with the POSTNET barcode for the forwarding address.

At block 512, control module 312 sends marking requests to print module 412 to read the bit-map patterns of the POSTNET barcode from markings database 416 that represent the ZIP code captured by scanner 306. As mentioned above, print module 412 is being utilized because control module 312 was set to print upright markings at block 502. Print module 412 reads each bit-map of each bar, in the POSTNET barcode markings, from right to left and reads each column of dots within each bar in an order from right to left. Print module 412 translates the bit-map information into print instructions, and sends the print instructions to print head 402 to print the barcode markings in the order mentioned above.

At block 514, print head 402 receives the print instructions and sequentially prints each of the bars in the barcode from right to left on the bottom of the mailpiece, as the mailpiece passes in front of print head 402.

At block 516, the mailpiece exits transporter 308, through exit 408, and travels through mail sorter 300 while undergoing further processing, such as being sorted to the appropriate bin in bin module 310. Once the processing of the mailpiece is complete, the operator retrieves the mailpieces from one or more bins and prepares the mailpieces for another pass At block 518, the operator sets mail sorter 300 for another pass. Similar to block 502, the operator sets control module 312 for another pass, but at block 518 the operator sets control module 312 for inverted printing, rather than upright printing. As a result, control module 312 is set to send marking requests to inverted print module 414. Additionally, the operator loads inverted mailpieces onto feeder 302. Thus, the mailpieces are positioned on feeder 302, such that the address information and the barcode information, which was printed during the previous sort, will be upside down when the mailpieces pass in front of print head 402. It should be realized that it is not important how the mailpieces are inverted, only that they are inverted before passing print head 402. For example, the mailpieces may be inverted automatically by an electromechanical system. Moreover, it should be realized that if it is only required to print either along the top of the mailpieces or along the bottom of the mailpieces, then the mailpieces only have to pass by print head 402 once. The mailpieces are either in an upright position or inverted position or both, depending upon whether the objective is to print along the top or bottom or both, of the mailpieces.

At block 520, the operator loads mailpieces in an inverted and vertical orientation onto feeder 302, which feeds the mailpieces into singulator 304. It should be realized that the mailpieces and print head 402 are oriented vertically for the purpose of this illustration, but could be oriented horizontally to function with a mail system that moves mailpieces horizontally. As mentioned before, the mailpieces are loaded in an inverted and vertical orientation, with the front of the mailpieces oriented such that they will face print head 402 as they are transferred passed it. Because at block 502 the operator set control module 312 to print inverted markings, the operator loads the mailpieces in an inverted orientation.

At block 522, the mailpieces are transferred from feeder 302 to singulator 304, which moves the mailpieces to transporter 308, while assuring that only one mailpiece at a time is forwarded to transporter 308. Transporter 308 transfers the mailpiece in a vertical position, from left to right passed scanner 306.

In reference to a single mailpiece, at block 524, scanner 306 scans the surface of the mailpiece and captures image data of the address on the mailpiece and sends the image data to control module 312. OCR 420 translates the image data into ASCII characters, which represent the address on the mailpiece.

At block 526, using the ASCII representation of the address, control module 312 queries the national address directory table stored in database 418 for an address that matches at least part of the address information captured by the scanner. For example, if an address and/or zip code, captured from the mailpiece, is found in the query of the national address directory, this information can be used to determine a meter rate and meter rate indicia, if postal zone based postage rates apply. Once the address is located in the table, control module 312 accesses data representative of the meter rate, which is also located in the table. The meter rate may vary from address to address, given certain classes of mail postage rates. Also, other markings can be printed with the meter indicia, such as a United States Postal inscription and meter advertisement graphics or text.

At block 528, control module 312 sends marking requests to inverted print module 414 to read bit-map patterns, from markings database 416, representative of the meter rate that was found from the query of database 418 at block 526. As mentioned above, inverted print module 414 is utilized because control module 312 was set to print inverted markings at block 518. The meter rate is printed as meter indicia and is typically made up of several bit-maps. One bit-map contains the information that does not vary, such as graphics for the indicia (for example an image of an eagle). Other bit-maps contain the characters and numbers for a variable part of the meter indicia, such as a postage value, a date, a time, and other characters. These individual bit-maps are typically combined into one larger bit-map by either print module 412 or inverted print module 414. In this illustration, inverted print module 414 reads the combined bitmaps for the meter indicia. More specifically, inverted print module 414 reads the dots in the left most column in the bit-map and changes the print location of each dot before sending print instructions to print head 402. The print location is determined by reading a dot and assigning it a different print location. Because the mailpiece is upside down, in this example, the dot at the top of the column is assigned to the print position of the bottom dot. The bottom dot is assigned to the print position of the top dot. The dot that is second from the top of the column is assigned to a print position that is second from the bottom. This process continues for each dot within a column. Once the dots in the left most column have been reassigned, inverted print module 414 reads and reassigns the dots in the column to the right of the left most column and continues until the meter indicia, and/or postal inscription, and/or advertisement language or graphics are read, reassigned, and transformed into print instructions.

At block 530, print head 402 receives the print instructions from inverted print module 414. Accordingly, print head 402 prints the inverted meter indicia, containing, for example, a postal value. Thus, when the mailpiece is viewed in an upright orientation, the meter indicia is also oriented upright and in an orientation for reading from left to right.

At block 532, the mailpiece exits transporter 308, through exit 408, and travels through mail sorter 300 while undergoing further processing, such as being sorted to the appropriate bin in bin module 310. Once the processing of the mailpiece is complete, the operator retrieves the mailpieces from one or more bins and prepares the mailpieces for another pass, if necessary.

The above presents various principles and features of the invention through descriptions of various embodiments. It is understood that skilled artisans can make various changes and modifications to the embodiments without departing from the spirit and scope of this invention, which is defined by the following claims.

The invention claimed is:

1. An apparatus for printing markings along a top edge and a bottom edge on a front face of a mailpiece in at least two passes through the apparatus, in at least two different orientations, and using a print head in a fixed position, the apparatus comprising:

the print head in the fixed position, where the print head receives print instructions and prints both a first set of markings in a first marking pass, and a second set of markings onto the mailpiece in a second marking pass;

a memory containing data representative of the first and second markings, the first markings associated with a first orientation, the second markings associated with a second orientation;

a print module, coupled to the memory and to the print head, for reading the data representative of the first set of markings from the memory, and converting the data to print instructions that instruct the print head to print the first set of markings onto the mailpiece having the first orientation during the first marking pass;

an inverted print module, coupled to the memory and to the print head, for reading the data representative of the second set of markings from the memory, and converting the data to print instructions that instruct the print head to invert the second set of markings on the print head during the second marking pass and printing onto the mailpiece disposed in the second orientation which is inverted about 180 degrees with respect to the first orientation of the mailpiece; and a control module, coupled to the print module and the inverted print module, for sending marking requests to either the print module or the inverted print module, the marking request indicating which data representative of the first or second sets of markings that are to be read from the memory, by the print module or the inverted print module, based on whether the mailpiece is being passed in the first or second orientation.

2. The apparatus of claim 1 further comprising:

a scanner for capturing image data from the mailpiece; and an optical character recognition, coupled to the scanner and the control module, for converting the image data to computer data, where the control module queries a second memory for instructions as to what first set of markings and/or second set of markings are related.

3. The apparatus of claim 1 wherein the first and second sets of markings are characters, numbers, symbols, graphics, meter indicia, barcodes, POSTNET barcodes, advertisements, and/or advertisement slogans.

4. A method for printing along top edges and bottom edges on front faces of mixed mailpieces, the method comprising:

associating first markings with a first mailpiece orientation;

associating second markings with a second mailpiece orientation;

transporting a mailpiece in the first orientation;

printing, with a fixed print head, the first markings on a first side on the front face of the mailpiece, the mailpiece being transported in the first orientation;

reorienting the mailpiece to the second orientation which is about 180 degrees from the first orientation;

transporting the mailpiece in the second orientation; and printing on a second side on the front face of the mailpiece, with the fixed print head, the second markings that are rotated on the print head about 180 degrees from the first orientation of the mailpiece;

wherein said printing steps are responsive the associating of the first or second markings with the first or second mailpiece orientations.

5. The method in claim 4 further comprising:

determining address information from the mailpiece; and determining the first markings based upon the address information.

6. The method in claim 4 further comprising:

determining address information from the mailpiece; and determining the second markings based upon the address information.

7. The method of claim 4 wherein the first and the second markings are characters, numbers, symbols, graphics, meter indicia, barcodes, POSTNET barcodes, advertisements, and/or advertisement slogans.

* * * * *